3,020,142
HERBICIDAL METHOD EMPLOYING N-(3-CHLORO-4-METHYLPHENYL)-2-METHYL-PENTANAMIDE

Joe R. Willard and Kenneth P. Dorschner, Middleport, N.Y., assignors to FMC Corporation, a corporation of Delaware
No Drawing. Filed Apr. 14, 1958, Ser. No. 728,058
1 Claim. (Cl. 71—2.3)

This invention relates to novel herbicidal compositions. More particularly, this invention relates to selectivity active herbicidal compositions.

The herbicidal compositions of this invention comprise as the active ingredient N-(3-chloro-4-methylphenyl)-2-methylpentanamide which has the structural formula

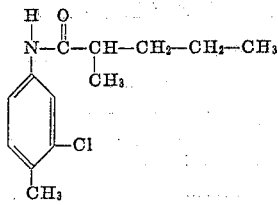

N-(3-chloro-4-methylphenyl)-2-methylpentanamide may be prepared by reacting 3-chloro-4-methylaniline with 2-methylpentanoyl chloride in the presence of an acid acceptor such as sodium carbonate. This method of preparation may be illustrated by the following example:

EXAMPLE I

To a stirred suspension of 1909 parts of 3-chloro-4-methylaniline and 742 parts of sodium carbonate in 3000 parts of benzene were added 1810 parts of 2-methylpentanoyl chloride, 4 hours being required to complete the addition. The mixture was held at the reflux temperature for 1 hour. Allowed to stand overnight, the mixture was then raised to the reflux temperature and maintained at that temperature for 3 hours. The mixture was cooled, an additional 2000 parts of benzene added and the mixture washed with 2000 parts of 2% hydrochloric acid solution. The acid wash was decanted and the benzene layer concentrated under reduced pressure to give 2726 parts of pale, yellow solid which melted at 74–77°. Recrystallization increased the melting point to 79–80°. Analysis: Calcd. for $C_{13}H_{17}ClNO$: C, 63.84; H, 7.14. Found: C, 64.09; H, 6.91.

N-(3-chloro-4-methylphenyl)-2-methylpentanamide exhibits a remarkable degree of selectivity. This selectivity may be illustrated more clearly by reference to Table I below. In this table the dosage is expressed in pounds of N-(3-chloro-4-methylphenyl)-2-methylpentanamide per acre. In greenhouse studies, the indicated amount of toxicant was applied in the equivalent of 100 gallons per acre. The percent kill at different concentrations is indicated next to each plant. The herbicide was applied in a post-emergent application.

Table I

| | Dosage (lbs./A.) | | | | | | |
|---|---|---|---|---|---|---|---|
| | 6 | 4 | 3 | 2 | 1 | ½ | ¼ |
| Lettuce | 100 | 100 | 100 | 100 | 100 | 100 | 80 |
| Mustard | 100 | 100 | 100 | 100 | 100 | 100 | 0 |
| Rye Grass | 75 | 100 | 50 | 100 | 0 | 0 | 0 |
| Crabgrass | 100 | 100 | 100 | 100 | 100 | 70 | 50 |
| Foxtail Grass | 100 | | 100 | | 0 | 0 | 0 |
| Lambsquarters | | | | | 100 | 100 | 100 |
| Pigweed | | 100 | | 100 | 100 | 50 | |
| Velvet Leaf | | 100 | | 100 | 100 | 50 | |
| Canada Thistle | | | | | 0 | | |
| Lima Beans | 50 | 50 | 0 | 50 | 0 | 0 | 0 |
| Corn | 0 | 0 | 0 | 0 | 0 | 0 | 0 |
| Cotton | 100 | 100 | 100 | 100 | 0 | 0 | 0 |
| Flax | 100 | 100 | 100 | 100 | 0 | 0 | 0 |
| Oats | 85 | 10 | 0 | 10 | 0 | 0 | 0 |
| Carrots | 0 | 0 | 0 | 0 | 0 | 0 | 0 |
| Peanuts | | 0 | 0 | 0 | 0 | 0 | |
| Celery | 40 | | 20 | | 0 | | |
| Onions | 100 | | 100 | | | | |
| Alfalfa | | | 80 | | 0 | | |
| Peas | | | 10 | | 0 | | |
| Cucumbers | | | 100 | | 95 | | |

From the above table it will be seen that this herbicide is extremely toxic to plants such as lettuce and cucumbers at concentrations as low as 1 pound per acre. It is virtually non-toxic to other plants such as lima beans, flax, cotton, and rye grass at this concentration, but is extremely toxic at concentrations of about 2 pounds per acre. It has virtually no toxicity at the highest dosage on plants such as corn, carrots, and peanuts, while it is extremely toxic to weeds such as mustard, lambsquarters, pigweed, at all concentrations tested.

This herbicidal activity and selectivity are indeed surprising in view of the relative inactivity of the analogous compound N-(3-chlorophenyl)-2-methylpropanamide. This comparison is shown more clearly in Table II below. The compounds were applied at a dosage of 4 pounds per acre. The figures indicate the percent kill of the particular species of plant after the pre-emergent or post-emergent application.

Table II

| | N-(3-chlorophenyl)-2-methylpropanamide | N-(3-chloro-4-methyl-phenyl)-2-methyl-pentanamide | |
|---|---|---|---|
| | Post-emergent | Post-emergent | Pre-emergent |
| Lima Beans | 0 | 0 | 0 |
| Corn | 0 | 0 | 0 |
| Cotton | 50 | 100 | 0 |
| Flax | 50 | 100 | 0 |
| Oats | 0 | 10 | 0 |
| Carrots | 0 | 0 | 0 |
| Lettuce | 100 | 100 | 0 |
| Mustard | 60 | 100 | 100 |
| Rye Grass | 0 | 100 | 0 |

N-(3-chloro-4-methylphenyl)-2-methylpentanamide is highly selective when used as a post-emergent or pre-emergent treatment. It is especially effective in controlling broad-leaf weedy plants, such as the Crucifers, when applied as a pre-emergent treatment. When applied as a post-emergent treatment it is effective in controlling broad-leaf weedy plants and grassy weeds. In the post-emergent treatment the herbicide will be applied to the growing plant. In the pre-emergent treatment, the herbicide will be applied to the soil, usually the seeded soil, before the plants have emerged therefrom, and usually at the time of crop-seeding. Reference herein to treating the "plant life" will be understood to include both the pre-emergent and post-emergent treatment.

The pentanamide may be applied to the post-emergent plant life by any of the normal means such as in the form of an emulsion, or by an aqueous suspension of a wettable powder.

Stable concentrates of the herbicide for use in forming aqueous emulsions may be prepared, for example by mixing about 5 to 75 parts by weight of the pentanamide, about 95 to 25 parts of solvent such as xylene, cyclohexanone, etc. and about 1 to 15 parts of a suitable emulsifying agent. At the point of use this concentrate may be dispersed in from about 100 to 10,000 parts of water to form an emulsion suitable for spraying. A preferred spray formulation comprises a 20 percent by weight xylene solution of the active ingredient.

When the pentanamide is to be employed as a wettable powder about 10 to 90 parts by weight of the herbicide is mixed with about 90 to 10 parts of a powder such as kaolin and about 1 to 10 parts of a surfacant. The powder may then be dispersed in about 100 to 10,000 parts of water at the point of use and applied by means of a spray.

When the pentanamide is to be employed as an emulsifiable formulation, the following formulations have been found to be advantageous:

FORMULATION I

| | Percent |
|---|---|
| N-(3-chloro-4-methylphenyl)-2-methylpentanamide | 26.0 |
| Xylene | 64.0 |
| Surfactant (alkylaryl polyether alcohol) | 10.0 |

When the pentanamide is to be employed as a wettable powder, the following formulations have been found to be advantageous:

FORMULATION II

| | Percent |
|---|---|
| N-(3-chloro-4-methylphenyl)-2-methylpentanamide | 50.0 |
| Kaolin | 47.7 |
| Glycerol mannitan laurate | 1.0 |
| Sodium lignosulfonate | 1.0 |
| Sulfonated aliphatic polyesters | 0.3 |

FORMULATION III

| | Percent |
|---|---|
| N-(3-chloro-4-methylphenyl)-2-methylpentanamide | 50.0 |
| Kaolin | 48.0 |
| Sodium lignosulfate | 1.0 |
| Sodium lauryl sulfate | 1.0 |

In the above formulations, all percentages are by weight. These formulations are illustrative only and may be varied over wide limits by those skilled in the art.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claim, the invention may be practiced by those skilled in the art and having the benefit of this disclosure, otherwise than as specifically described and exemplified herein.

That which is claimed as patently novel is:

The method of destroying and inhibiting undesirable vegetation which comprises treating the undesirable vegetation with a phytotoxic amount and concentration of N-(3-chloro-4-methylphenyl)-2-methylpentanamide.

References Cited in the file of this patent

UNITED STATES PATENTS

| | | |
|---|---|---|
| 2,226,672 | Smith | Dec. 31, 1940 |
| 2,386,779 | Coleman et al. | Oct. 16, 1945 |
| 2,636,816 | Stewart | Apr. 28, 1953 |
| 2,849,465 | Randall et al. | Aug. 26, 1958 |
| 2,863,752 | Hamm et al. | Dec. 9, 1958 |

OTHER REFERENCES

Pontovich, Chemical Abstracts, 1945, vol. 39, Col. 3570(5).

"Plant Regulators," page 40, Chemical Biological Series, No. 2, June 1955, publication 384.